(12) United States Patent
Andersson et al.

(10) Patent No.: US 9,846,790 B2
(45) Date of Patent: Dec. 19, 2017

(54) METHOD FOR CHANGING AN OPERATING MODE OF A MOBILE DEVICE

(75) Inventors: Stefan Andersson, Klagerup (SE); Hans Wachtmeister, Malmo (SE)

(73) Assignee: Sony Mobile Communications Inc., Tokyo (JP)

(*) Notice: Subject to any disclaimer, the term of this patent is extended or adjusted under 35 U.S.C. 154(b) by 623 days.

(21) Appl. No.: 13/382,364

(22) PCT Filed: Dec. 17, 2010

(86) PCT No.: PCT/EP2010/007755
§ 371 (c)(1),
(2), (4) Date: Jan. 5, 2012

(87) PCT Pub. No.: WO2012/079612
PCT Pub. Date: Jun. 21, 2012

(65) Prior Publication Data
US 2012/0190338 A1    Jul. 26, 2012

(51) Int. Cl.
*G06F 21/74* (2013.01)
*G06F 21/33* (2013.01)
*H04W 12/08* (2009.01)

(52) U.S. Cl.
CPC .............. *G06F 21/74* (2013.01); *G06F 21/33* (2013.01); *H04W 12/08* (2013.01)

(58) Field of Classification Search
CPC .......... G06F 21/10; G06F 21/33; G06F 21/74; G06F 21/121; G06F 2221/2149; G06F 21/51; G06F 21/60; G06F 21/62; G06F 21/88; H04W 12/08; H04W 12/12
USPC .................................... 455/410, 411, 418–42
See application file for complete search history.

(56) References Cited

U.S. PATENT DOCUMENTS

| | | | |
|---|---|---|---|
| 6,707,915 B1* | 3/2004 | Jobst et al. ................... | 380/247 |
| 2008/0003980 A1 | 1/2008 | Voss et al. | |
| 2008/0165971 A1 | 7/2008 | De Cesare et al. | |
| 2010/0169965 A1* | 7/2010 | Chhabra ................ | G06F 21/88 726/17 |
| 2010/0219979 A1* | 9/2010 | Ordogh .................... | 340/825.49 |

(Continued)

FOREIGN PATENT DOCUMENTS

EP    1217850 A1    6/2002

OTHER PUBLICATIONS

Miller, Ross, "The secret to Palm Pre dev mode lies in the Konami code", (2009), [retrieved online], <http://www.engadget.com/2009/06/10/the-secret-to-palm-pre-dev-mode-lies-in-the-konami-code/>.

(Continued)

*Primary Examiner* — Thai Vu
(74) *Attorney, Agent, or Firm* — Renner, Otto, Boisselle & Sklar, LLP

(57) ABSTRACT

A method for changing an operating mode of a mobile device is provided. According to the method, a request from the user of the mobile device to change from a first operating mode to a second operating mode is received. In response to the received request a credential is requested from the user. Next, the credential (RCK) is received from the user and validated. If the received credential (RCK) is valid, the second operating mode is set and an indication of the mobile device indicating that the second operating mode has been set is set. If the second operating mode has been set, a reset of the indication is prohibited.

19 Claims, 2 Drawing Sheets

(56) References Cited

U.S. PATENT DOCUMENTS

2010/0229219 A1* 9/2010 Mendonca ........................ 726/4
2011/0034211 A1* 2/2011 Li ................................. 455/558

OTHER PUBLICATIONS

Paul, "How to unlock the bootloader on your Nexus One", (2010), [retrieved online], <http://android.modaco.com/topic/299078-how-to-unlock-the-bootloader-on-your-nexus-one/>.
International Search Report from corresponding International Application No. PCT/EP2010/007755, dated Aug. 24, 2011.
Written Opinion of the International Search Authority from corresponding International Application No. PCT/EP2010/007755, dated Aug. 24, 2011.

* cited by examiner

METHOD FOR CHANGING AN OPERATING MODE OF A MOBILE DEVICE

The present invention relates to a method for changing an operating mode of a mobile device and a mobile device implementing the method.

BACKGROUND OF THE INVENTION

Mobile devices, especially for example mobile phones, are in general provided with an operating system and application software which are provided together with the mobile device by a manufacturer of the mobile device. Furthermore, the application software of the mobile device may be extended by additional applications which may be downloaded to the mobile device from a corresponding download service. Therefore, a mobile device typically does not allow a user to modify the operating system or the application software which were originally delivered with the mobile device. However, for several reasons it may be useful to allow a user of the mobile device to gain more access to the mobile device, for example for software developers who may need to modify parts of the operating system or the application software during development of new software, for example for debugging the new software. Such an extended access may be also called root access to the mobile device. However, once the root access is granted, the manufacturer of the mobile device has no longer control of the software running on the mobile device. Modifications carried out on the operating system or the application software may lead to a malfunction of the mobile device or may even damage the hardware of the mobile device. Furthermore, modifying the operating system or the application software may be used by an unauthorized invading person, a so-called hacker, to get access to, spy out or modify private or sensitive information of the user of the mobile device.

Therefore, there is need to provide a method for granting a root access to a user of the mobile device avoiding the above described problems.

SUMMARY OF THE INVENTION

According to the present invention, this need is met by a method for changing an operating mode of a mobile device as defined in claim 1 and a mobile device as defined in claim 9. The dependent claims define preferred and advantageous embodiments of the invention.

According to an aspect of the present invention, a method for changing an operating mode of a mobile device, for example a mobile phone, is provided. According to the method a request from the user of the mobile device to change from a first operating mode to a second operating mode is received. Upon receiving the request the mobile device requests a credential from the user. The user inputs the credential into the mobile device and the received credential is validated. If the received credential is valid, the second operating mode is set and an indication of the mobile device indicating that the second operating mode has been set is also set. Once the second operating mode has been set, a reset of the indication indicating that the second operating mode has been set is prohibited. The first operating mode may comprise a user mode and the second operating mode may comprise a developer mode, a so-called root access mode. By requesting and validating a credential before changing from the first operating mode to the second operating mode an unauthorized change of the operating mode, for example by an invading person, can be avoided. Once the operating mode has been changed from the first operating mode to the second operating mode, the indication is set and cannot be reset, even if the mobile device is changed back to the first operating mode. Therefore, a manufacturer or user of the mobile device can easily check if the mobile device has been rooted which means that the operating mode of the mobile device has been changed to the second operating mode in the past.

According to an embodiment, the indication comprises a device identifier of the mobile device. For indicating that the operating mode of the mobile device has been changed from the first operating mode to the second operating mode the device identifier may be erased. This may be used as a clear indication that the mobile device has been changed to the second operating mode at least once in the past.

According to another embodiment the indication relates to a section of a memory unit of the mobile device and the indication is set by storing the received credential in the section of the memory unit. This may be used for indicating a booting software of the mobile device that the mobile device has been switched into the second operating mode and shall be started up accordingly.

According to another embodiment the first operating mode comprises a user mode in which an operation software download function and a debug function for debugging software running on the mobile device are disabled and an access to user data stored in the mobile device is enabled. Furthermore, the second operating mode comprises a developer mode in which the operation software download function and the debug function are enabled and an access to the user data is disabled. Additionally, when setting the second operating mode, at least a part of the user data stored in the mobile device may be erased. Thus, even if an unauthorized person gets root access by changing the operating mode of the mobile device to the second operating mode, the user data may be protected.

According to another embodiment, the second operating mode is not set, if a so-called SIM-lock indication of the mobile device is set or active. Accordingly, the indication that the second operating mode has been set, is not set in this case. The SIM lock indication may indicate that the mobile device is allowed to be operated only in connection with a specific subscriber identity module (SIM). Some mobile network providers use such a SIM-lock when the mobile device is sold in connection with a contract for mobile communication via the provider's network. By prohibiting that the second operating mode is set in a SIM-locked mobile device, fundamental modifications of the mobile device, for example changes in the operating system, which may circumvent the SIM-lock or provide the mobile device with further functionalities which are unwanted by the provider, can be avoided.

According to a further embodiment the step of validating the received credential comprises encoding the received credential with a predetermined unidirectional encoding scheme and comparing the encoded received credential with an encoded reference credential stored in the mobile device. The credential may comprise for example a password or a personal identification number (PIN) which is only known by the user or the owner of the mobile device. By encoding the received credential with a predetermined unidirectional encoding scheme and comparing the encoded credential with an encoded reference credential, the encoded reference credential can be stored unprotected and open to the public without giving an invading person a way to find out the credential.

Furthermore, the credential may be derived from a predetermined key information and an IMEI information of the mobile device. The IMEI information comprises an international mobile equipment identity which is unique for the mobile device. An encoded reference credential based on the IMEI information and the key information may be stored in the mobile device. The user who wants to change the operating mode of the mobile device may request an encoded credential from a web service by sending the IMEI information of the mobile device to the web service and receiving the corresponding encoded credential from the web service. This may make the logistics around device unique passwords simpler and the manufacturer may keep track of devices for which the credential has been requested.

According to another aspect of the present invention a mobile device is provided. The mobile device comprises an input device for receiving input information from a user of the mobile device, an output device for outputting output information to the user, and a processing unit connected to the input device and the output device. The processing unit is adapted to receive a request from the user to change an operating mode of the mobile device from a first operating mode to a second operating mode. In response to the received request the processing unit requests and receives a credential from the user. Next, the processing unit validates the received credential and if the received credential is valid, the processing unit sets the second operating mode, sets an indication of the mobile device indicating that the second operating mode has been set, and prohibits resetting the indication indicating that the second operating mode has been set.

The mobile device may be adapted to perform the above-described method and comprises therefore the above-described advantages.

The mobile device may comprise a mobile phone, a personal digital assistant, a digital camera or a navigation system.

Although specific features described in the above summary and the following detailed description are described in connection with specific embodiments, it is to be understood that the features of the embodiments can be combined with each other unless noted otherwise.

BRIEF DESCRIPTION OF THE DRAWINGS

The invention will now be described in more detail with reference to the accompanying drawings.

DETAILED DESCRIPTION OF PREFERRED EMBODIMENTS

In the following, exemplary embodiments of the present invention will be described in more detail. It has to be understood that the following description is given only for the purpose of illustrating the principles of the invention and is not to be taken in a limiting sense. Rather, the scope of the invention is defined only by the appended claims and not intended to be limited by the exemplary embodiments herein after.

It is to be understood that the features of the various exemplary embodiments described herein may be combined with each other unless specifically noted otherwise. Same reference signs in the various instances of the drawings refer to similar or identical components.

Figure 1:
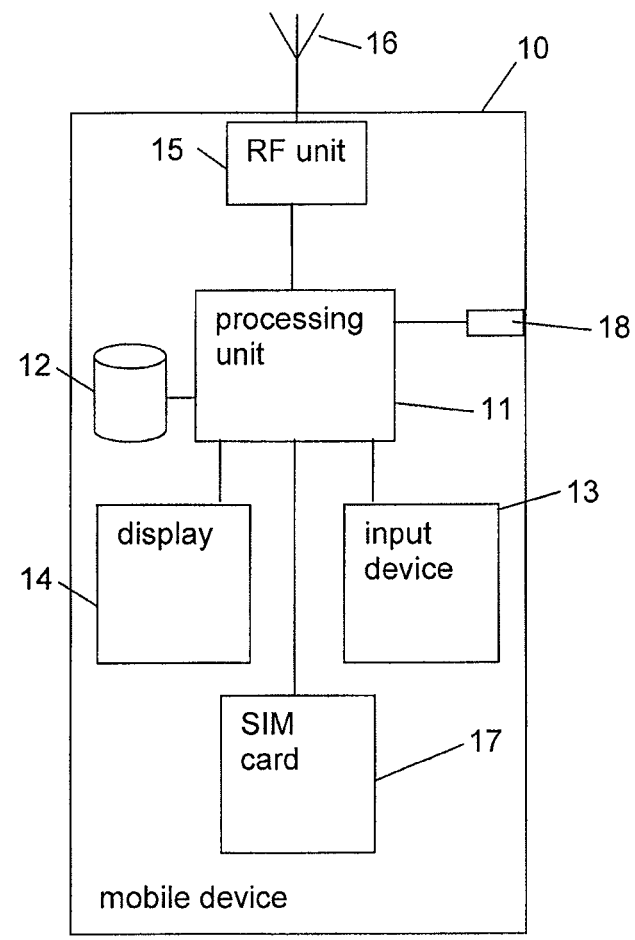
FIG. 1 shows a block diagram of a mobile device according to an embodiment of the present invention.

FIG. 1 schematically shows a mobile device 10, for example a mobile phone. The mobile device 10 comprises a processing unit 11, a memory unit 12, an input device 13, a display 14, a radio frequency unit 15, an antenna 16, and a subscriber identity module (SIM) card 17. The display 14 may comprise for example a liquid crystal display adapted to display a graphical user interface. The input device 13 may comprise a plurality of push buttons and a touch sensitive surface which may be arranged on a surface of the display 14 thus composing a so-called touch screen. The radio frequency unit 15 may be adapted to receive and transmit data, especially voice data. The SIM card 17 may provide information to identify the subscriber on the mobile telephonic device to get access to a mobile communication network. The mobile device 10 furthermore comprises a connector 18 for coupling the mobile device to a computer for a data exchange. The connector 18 may comprise for example an USB connector. However, the connector 18 may also comprise a unit for providing a wireless connection to the computer, for example via a wireless local area network or a wireless short range radio frequency connection.

In the memory unit 12 an operating software, an application software, data of the operating software, data of the application software and user data may be stored. In more detail, the software and data stored in the memory unit 12 may comprise for example a boot software, a so-called S1 boot software, a software for a digital signal processor of the mobile device 10, a file system and a software for a modem of the mobile device 10, a file system for the operating system, a file system for the user data, a recovery area, an operating system kernel, a trusted computing base access (TCB) to a hardware unique key (HUK), SIM lock data, keys for a digital rights management, and data of a credential manager. Some of the data, especially the SIM lock data and the data of the credential manager may be stored in a so-called trim area (TA) which is accessible by a specific application program interface.

In connection with FIG. 2 will be described in the following a method to gain an extended access, a so-called root access, to the mobile device 10. Getting root access to the device will also be called "rooting". Rooting means allowing root access to the environment of the operating system, effectively allowing a user of the mobile device 10 to do nearly anything with the device. However, rooting shall only be allowed on devices that are not SIM locked. Therefore, the presence of a corresponding tag in the SIM lock data shall indicate if rooting is allowed.

Figure 2:
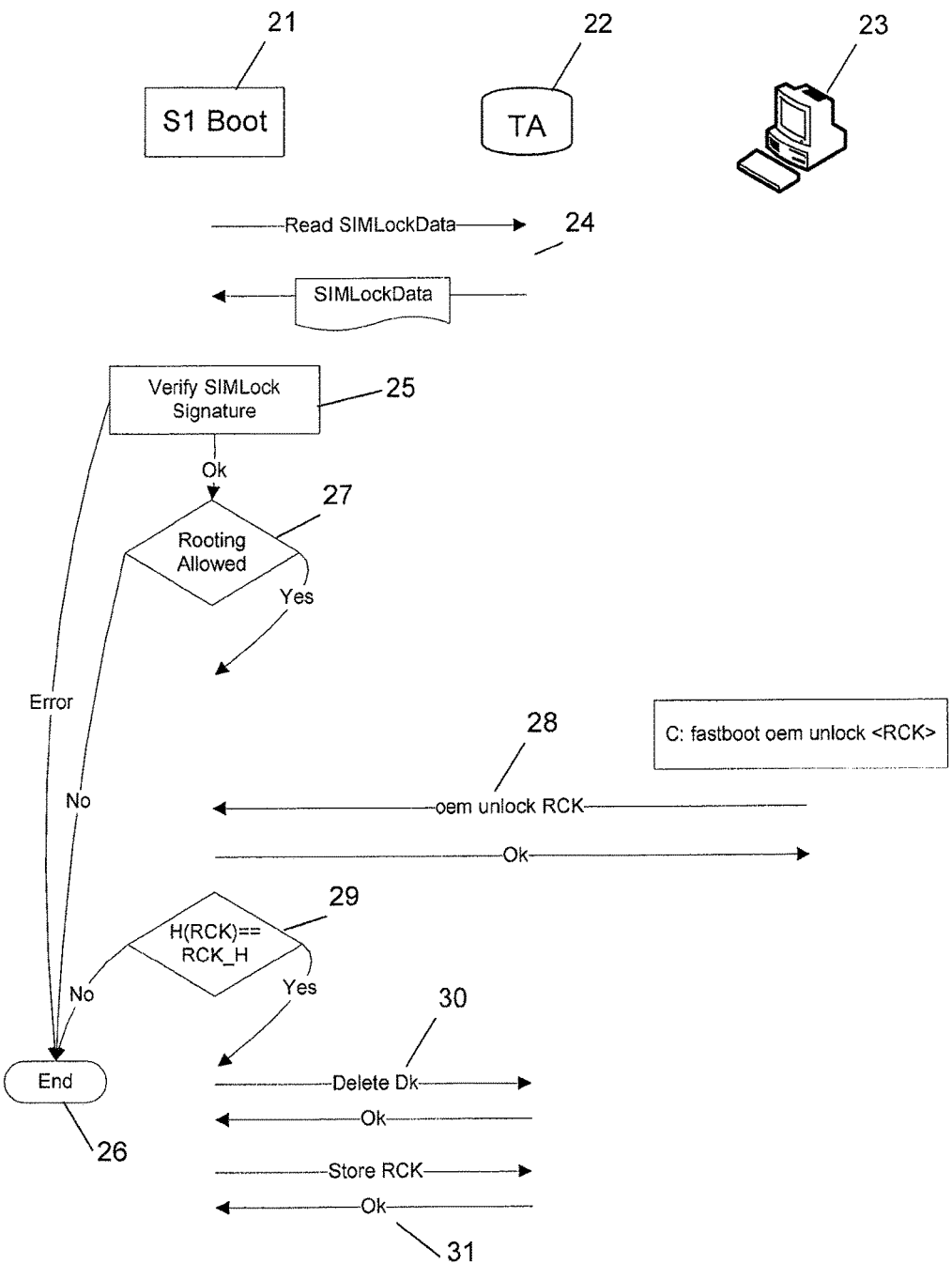
FIG. 2 shows a flow chart for changing an operating mode of a mobile device according to an embodiment of the present invention.

FIG. 2 shows the interaction between the boot software 21, the trim area 22 and a computer 23 connected to the mobile device 10 via the connector 18. First, the boot software reads the SIM lock data from the trim area 22 (step 24). In step 25 a signature of the SIM lock data is verified to check, if the values in the SIM lock data can be trusted. If the verification fails, the root mode cannot be entered (step 26). If the verification is positive, the tag indicating if rooting is allowed is checked (step 27). If rooting is not allowed, the process is ended (step 26). If it is determined in step 27 that rooting is allowed, a rooting control key (RCK) is received from the computer 23 (step 28). In step 29 the received rooting control key is compared to a reference rooting control key (RCK_H) of the mobile device 10. If there is a mismatch between the received rooting control key and the reference rooting control key of the mobile device the process is ended at step 26. Otherwise a device key (Dk) of the mobile device is deleted in step 30 and the received rooting control key (RCK) is stored in the trim area 22 in step 31. In more detail, the reference rooting control key RCK_H of the mobile device may be a hash coded credential which is derived from a master key and an international mobile equipment identity (IMEI). Therefore, the reference rooting control key (RCK) received from the computer 23 has to be hash coded before being compared to the rooting control key RCK_H of the mobile device 10.

The device key Dk is erased when the correct rooting control key RCK is received, i.e. before the plain text RCK is written to the trim area 22 to indicate that the mobile device has been rooted. The rooting control key RCK may be distributed by several means, for example via the internet to the computer 23 or as a written note in a selling box of the mobile device 10 which has to be entered into the computer 23.

When the root mode of the mobile device 10 is entered all sensitive material stored on the mobile device shall be unusable. This relates especially to the hardware unique key HUK, the SIM lock data, the digital rights management keys (DRM) and the data stored by the credential manager. To refuse the use of the hardware unique key HUK, the trusted computing base TCB shall refuse access to the HUK on a rooted device.

On the other hand, in the root mode downloading of new application software and parts of the operating system as well as enabling a debug mode of the mobile device 10 is enabled.

While exemplary embodiments have been described above, various modifications may be implemented in other embodiments. Furthermore, it is to be understood that all the embodiments described above are considered to be comprised by the present invention as it is defined by the appended claims.

The invention claimed is:

1. A method for changing an operating mode of a mobile device, the method comprising the steps of:
    receiving a request from a user of the mobile device to change from a first operating mode to a second operating mode,
    requesting a credential from the user in response to the received request,
    receive the credential from the user,
    validating the received credential,
    setting the second operating mode and setting an indication of the mobile device indicating that the second operating mode has been set, and
    after the second operating mode has been set, prohibiting a reset of the indication indicating that the second operating mode has been set and refusing access to a hardware unique key stored on the mobile device.

2. The method according to claim 1, wherein the indication comprises a device identifier of the mobile device, and wherein the step of setting the indication comprises erasing the device identifier.

3. The method according to claim 1, wherein the indication relates to a section of a memory unit of the mobile device, and wherein the step of setting the indication comprises storing the received credential in the section of the memory unit.

4. The method according to claim 1, wherein the first operating mode comprises a user mode and the second operating mode comprises a developer mode,
    wherein an operation software download function and a debug function for debugging software running on the mobile device are enabled in the developer mode and disabled in the user mode, and
    wherein an access to user data stored in the mobile device is disabled in the developer mode and enabled in the user mode.

5. The method according to claim 1, wherein setting the second operating mode comprises erasing at least part of user data stored in the mobile device.

6. The method according to claim 1, wherein the second operating mode and the indication are not set, if a SIM lock indication of the mobile device is set, the SIM lock indication indicating that the mobile device is allowed to be operated only in connection with a specific subscriber identity module.

7. The method according to claim 1, wherein the step of validating the received credential comprises:
    encoding the received credential with a predetermined unidirectional encoding scheme, and
    comparing the encoded received credential with an encoded reference credential stored in the mobile device.

8. The method according to claim 1, wherein the credential is derived from a predetermined key information and an IMEI information of the mobile device, wherein the IMEI information comprises an international mobile equipment identity which is unique for the mobile device.

9. A mobile device, comprising:
    an input device for receiving input information from a user of the mobile device,
    an output device for outputting output information to the user, and
    a processing unit adapted to
    receive via the input device a request from the user to change from a first operating mode of the mobile device to a second operating mode of the mobile device,
    request a credential from the user in response to the received request,
    receive a credential from the user,
    validate the received credential, and
    if the received credential is valid, set the second operating mode, set an indication of the mobile device indicating that the second operating mode has been set, prohibit resetting the indication indicating that the second operating mode has been set, and refuse access to a hardware unique key stored on the mobile device.

10. The mobile device according to claim 9, wherein the mobile device comprises at least one of the group comprising a mobile phone, a personal digital assistant, a digital camera, and a navigation system.

11. The mobile device of claim 9, wherein the indication comprises a device identifier of the mobile device, and wherein the step of setting the indication comprises erasing the device identifier.

12. The mobile device of claim 9, wherein the indication relates to a section of a memory unit of the mobile device, and wherein the step of setting the indication comprises storing the received credential in the section of the memory unit.

13. The mobile device of claim 9, wherein the first operating mode comprises: a user mode and the second operating mode comprises a developer mode, wherein an operation software download function and a debug function for debugging software running on the mobile device are enabled in the developer mode and disabled in the user mode, and wherein an access to user data stored in the mobile device is disabled in the developer mode and enabled in the user mode.

14. The mobile device of claim 9, wherein setting the second operating mode comprises erasing at least part of user data stored in the mobile device.

15. The mobile device of claim 9, wherein the second operating mode and the indication are not set, if a SIM lock indication of the mobile device is set, the SIM lock indication indicating that the mobile device is allowed to be operated only in connection with a specific subscriber identity module.

16. The mobile device of claim 9, wherein the step of validating the received credential comprises:
   encoding the received credential with a predetermined unidirectional encoding scheme, and
   comparing the encoded received credential with an encoded reference credential stored in the mobile device.

17. The mobile device of claim 9, wherein the credential is derived from a predetermined key information and an IMEI information of the mobile device, wherein the IMEI information comprises an international mobile equipment identity which is unique for the mobile device.

18. A method for changing an operating mode of a mobile device, the method comprising:
   receiving a request from a user of the mobile device to change from a first operating mode to a second operating mode,
   requesting a credential from the user in response to the received request,
   receive the credential from the user,
   validating the received credential,
   setting the second operating mode and setting an indication of the mobile device indicating that the second operating mode has been set, wherein the indication relates to a section of a memory unit of the mobile device which has limited access, and wherein the setting the indication comprises storing the received credential in the section of the memory unit for the stored credential to serve as the indication, and
   after the second operating mode has been set, prohibiting a reset of the indication indicating that the second operating mode has been set and refusing access to a hardware unique key stored in the mobile device.

19. A mobile device, comprising:
   an input device for receiving input information from a user of the mobile device,
   an output device for outputting output information to the user, and
   a processing unit adapted to:
      receive via the input device a request from the user to change from a first operating mode of the mobile device to a second operating mode of the mobile device,
      request a credential from the user in response to the received request,
      receive a credential from the user,
      validate the received credential, and
      if the received credential is valid:
         set the second operating mode,
         set an indication of the mobile device indicating that the second operating mode has been set, wherein the indication relates to a section of a memory unit of the mobile device which has limited access, and wherein setting the indication comprises storing the received credential in the section of the memory unit for the stored credential to serve as the indication, and
         after the second operating mode has been set, prohibit resetting the indication indicating that the second operating mode has been set and refuse access to a hardware unique key stored in the mobile device.

* * * * *